United States Patent
Zhang et al.

(10) Patent No.: US 11,320,818 B2
(45) Date of Patent: May 3, 2022

(54) METHOD, APPARATUS, DEVICE AND STORAGE MEDIUM FOR CONTROLLING UNMANNED VEHICLE

(71) Applicant: Baidu Online Network Technology (Beijing) Co., Ltd., Beijing (CN)

(72) Inventors: Lei Zhang, Beijing (CN); Hongda Zhang, Beijing (CN); Qijuan Yin, Beijing (CN); Wuzhao Zhang, Beijing (CN); Xiaoyan Wang, Beijing (CN); Baisheng Wang, Beijing (CN)

(73) Assignee: Apollo Intelligent Driving Technology (Beijing) Co., Ltd., Beijing (CN)

( * ) Notice: Subject to any disclaimer, the term of this patent is extended or adjusted under 35 U.S.C. 154(b) by 230 days.

(21) Appl. No.: 16/507,383

(22) Filed: Jul. 10, 2019

(65) Prior Publication Data

US 2020/0073378 A1 Mar. 5, 2020

(30) Foreign Application Priority Data

Aug. 31, 2018 (CN) .......................... 201811009284.5

(51) Int. Cl.
*G05D 1/00* (2006.01)
*B60W 30/095* (2012.01)

(52) U.S. Cl.
CPC ....... *G05D 1/0055* (2013.01); *B60W 30/0953* (2013.01); *B60W 30/0956* (2013.01);
(Continued)

(58) Field of Classification Search
CPC .............. G05D 1/0055; G05D 1/0088; B60W 30/0953; B60W 30/0956; B60W 2554/00; B60W 2520/105
See application file for complete search history.

(56) References Cited

U.S. PATENT DOCUMENTS

| 9,645,577 B1 * | 5/2017 | Frazzoli ............ B60W 30/0956 |
| 2004/0193347 A1 * | 9/2004 | Harumoto .............. G08G 1/167 701/45 |

(Continued)

FOREIGN PATENT DOCUMENTS

| CN | 102521978 | * | 2/2012 | ............... G08G 1/01 |
| CN | 102521978 A | * | 6/2012 | |

(Continued)

OTHER PUBLICATIONS

First Office Action of corresponding Chinese application No. 2018110092845 dated Apr. 21, 2021, 10 pages.

*Primary Examiner* — Peter D Nolan
*Assistant Examiner* — Kenneth M Dunne
(74) *Attorney, Agent, or Firm* — Harness, Dickey & Pierce, P.L.C.

(57) ABSTRACT

A method for controlling an unmanned vehicle includes: acquiring unmanned vehicle monitoring information of the unmanned vehicle when it is determined that a course of the unmanned vehicle will be out of control; determining a safety level corresponding to the unmanned monitoring information according to a predefined correspondence between unmanned vehicle monitoring information and a safety level; and controlling, according to the safety level corresponding to the unmanned monitoring information, the unmanned vehicle to drive. Thus, upon determining that the unmanned vehicle has gone beyond a boundary of the autopilot, the problem is identified that the unmanned vehicle will encounter a danger in driving. Then, the autopilot process of the unmanned vehicle is demoted according to the severity of the danger, e.g., decelerated or adjusted in its direction, to avoid safety hazards.

14 Claims, 4 Drawing Sheets

(52) U.S. Cl.
CPC ..... *G05D 1/0088* (2013.01); *B60W 2520/105* (2013.01); *B60W 2554/00* (2020.02); *G05D 2201/0213* (2013.01)

(56) References Cited

U.S. PATENT DOCUMENTS

| | | | | |
|---|---|---|---|---|
| 2012/0083947 A1* | 4/2012 | Anderson | ............... | G08G 1/165 |
| | | | | 701/3 |
| 2018/0141544 A1* | 5/2018 | Xiao | .................... | G05D 1/0214 |
| 2018/0154906 A1* | 6/2018 | Dudar | ................. | G05D 1/0088 |
| 2019/0041862 A1* | 2/2019 | Zaum | .................. | G01C 21/3461 |
| 2019/0049968 A1* | 2/2019 | Dean | .................... | G05D 1/0088 |
| 2019/0092342 A1* | 3/2019 | Biondo | ................ | B60W 10/06 |
| 2019/0344804 A1* | 11/2019 | Motomura | ............ | B60W 40/02 |
| 2019/0362633 A1* | 11/2019 | Kiryu | ................... | G06V 20/588 |
| 2020/0192357 A1* | 6/2020 | Park | ................. | B60W 60/0053 |

FOREIGN PATENT DOCUMENTS

| | | | | | |
|---|---|---|---|---|---|
| CN | 102521978 | A | | 6/2012 | |
| CN | 105270398 | | * | 1/2016 | .......... B60W 30/095 |
| CN | 105270398 | A | | 1/2016 | |
| CN | 106094823 | | * | 11/2016 | .......... G05D 1/0285 |
| CN | 106094823 | A | * | 11/2016 | |
| CN | 106094823 | A | | 11/2016 | |
| CN | 106094830 | A | | 11/2016 | |
| CN | 107515607 | A | | 12/2017 | |
| CN | 108422949 | A | | 8/2018 | |
| KR | 20150054442 | | * | 5/2015 | ............ B60W 40/02 |
| WO | 2017/145829 | A1 | | 8/2017 | |

\* cited by examiner

METHOD, APPARATUS, DEVICE AND STORAGE MEDIUM FOR CONTROLLING UNMANNED VEHICLE

CROSS-REFERENCE TO RELATED APPLICATION

This application claims priority to Chinese Patent Application No. 201811009284.5, filed on Aug. 31, 2018, which is hereby incorporated by reference in its entirety.

TECHNICAL FIELD

Embodiments of the present application relate to the technical field of unmanned vehicle and, in particular, to a method, an apparatus, a device and a storage medium for controlling an unmanned vehicle.

BACKGROUND

With the developments in the smart technology, unmanned vehicles are witnessing developments and practical applications. An unmanned vehicle needs to be monitored during driving.

Prior art employs a control algorithm to control an autopilot process of the unmanned vehicle, thereby accomplishing the autopilot for the unmanned vehicle. For instance, an anti-collision algorithm may be employed to test whether the unmanned vehicle is encountering an obstacle and whether collision will follow.

In prior art, once the control algorithm, which has been employed to control the unmanned vehicle, commits an error or inaccurate calculation, the autopilot process of the unmanned vehicle will be out of control, leading to dangers in driving the unmanned vehicle.

SUMMARY

Embodiments of the present application provide a method, an apparatus, a device and a storage medium for controlling an unmanned vehicle to address the aforementioned problem.

A first aspect of the present application provides a method for controlling an unmanned vehicle, including:

acquiring unmanned vehicle monitoring information of the unmanned vehicle when it is determined that a course of the unmanned vehicle will be out of control;

determining a safety level corresponding to the unmanned monitoring information according to a predefined correspondence between unmanned vehicle monitoring information and a safety level; and controlling, according to the safety level corresponding to the unmanned monitoring information, the unmanned vehicle to drive.

Further, where the controlling, according to the safety level corresponding to the unmanned monitoring information, the unmanned vehicle to drive includes:

determining unmanned driving information corresponding to the safety level according to a predefined correspondence between a safety level and unmanned driving information; and controlling, according to the unmanned driving information corresponding to the safety level, the unmanned vehicle to drive.

Further, where the controlling, according to the unmanned driving information corresponding to the safety level, the unmanned vehicle to drive includes:

determining an autopilot controlling apparatus corresponding to the safety level according to a predefined correspondence between a safety level and an autopilot controlling apparatus; and transmitting the unmanned driving information corresponding to the safety level to the autopilot controlling apparatus corresponding to the safety level to cause the autopilot controlling apparatus corresponding to the safety level to control driving of the unmanned vehicle.

Further, the unmanned vehicle monitoring information includes at least one of: a speed, a driving direction of the unmanned vehicle, location information of the unmanned vehicle, positioning frequency information, and an autopilot application status.

Further, the unmanned vehicle monitoring information includes at least one of: a changed speed, a changed driving direction, changed location information, and a changed positioning frequency.

Further, before the acquiring unmanned vehicle monitoring information of the unmanned vehicle when it is determined that a course of the unmanned vehicle will be out of control, the method further includes:

acquiring driving information of the unmanned vehicle; and determining that the course of the unmanned vehicle will be out of control if a value represented by the driving information is beyond a predefined boundary value.

Further, where the determining that the course of the unmanned vehicle will be out of control if a value represented by the driving information is beyond a predefined boundary value includes:

determining a predefined boundary value corresponding to the driving information according to a predefined boundary value list, where the boundary value list includes at least one piece of driving information, and each of the at least one piece of driving information has a predefined boundary value; and determining that the course of the unmanned vehicle will be out of control if a value represented by the driving information is beyond the predefined boundary value corresponding to the driving information.

Further, the predefined boundary value includes a predefined boundary value corresponding to at least one piece of driving scenario information, and where the determining a predefined boundary value corresponding to the driving information according to a predefined boundary value list includes:

acquiring driving scenario information of the unmanned vehicle;

determining a predefined boundary value corresponding to the driving information of the unmanned vehicle under the driving scenario information according to the driving information of the unmanned vehicle, the driving scenario information of the unmanned vehicle and the boundary value list, and where the determining that the course of the unmanned vehicle will be out of control if a value represented by the driving information is beyond the predefined boundary value corresponding to the driving information includes:

determining that the course of the unmanned vehicle will be out of control if a value represented by the driving information of the unmanned vehicle is beyond the predefined boundary value corresponding to the driving information of the unmanned vehicle under the driving scenario information.

Further, the driving information is any one of: an acceleration, a deceleration, a vehicle response time, a speed, and location information of an obstacle.

A second aspect of the present application provides an apparatus for controlling an unmanned vehicle, including:

a first acquiring unit, configured to acquire unmanned vehicle monitoring information of the unmanned vehicle when it is determined that a course of the unmanned vehicle will be out of control;

a first determining unit, configured to determine a safety level corresponding to the unmanned monitoring information according to a predefined correspondence between unmanned vehicle monitoring information and a safety level; and a controlling unit, configured to control, according to the safety level corresponding to the unmanned monitoring information, the unmanned vehicle to drive.

Further, the controlling unit includes:

a first determining module, configured to determine unmanned driving information corresponding to the safety level according to a predefined correspondence between a safety level and unmanned driving information; and a controlling module, configured to control, according to the unmanned driving information corresponding to the safety level, the unmanned vehicle to drive.

Further, the controlling module includes:

a first determining sub-module, configured to determine an autopilot controlling apparatus corresponding to the safety level according to a predefined correspondence between a safety level and an autopilot controlling apparatus; and a transmitting sub-module, configured to transmit the unmanned driving information corresponding to the safety level to the autopilot controlling apparatus corresponding to the safety level to cause the autopilot controlling apparatus corresponding to the safety level to control driving of the unmanned vehicle.

Further, the unmanned vehicle monitoring information includes at least one of: a speed, a driving direction of the unmanned vehicle, location information of the unmanned vehicle, positioning frequency information, and an autopilot application status.

Further, the unmanned vehicle monitoring information includes at least one of: a changed speed, a changed driving direction, changed location information, and a changed positioning frequency.

Further, the apparatus further includes:

a second acquiring unit, configured to acquire driving information of the unmanned vehicle before the first acquiring unit acquires the unmanned vehicle monitoring information of the unmanned vehicle when it has determined that the course of the unmanned vehicle will be out of control; and a second determining unit, configured to determine that the course of the unmanned vehicle will be out of control if a value represented by the driving information is beyond a predefined boundary value.

Further, the second determining unit includes:

a second determining module, configured to determine a predefined boundary value corresponding to the driving information according to a predefined boundary value list, where the boundary value list includes at least one piece of driving information, and each of the at least one piece of driving information has a predefined boundary value; and a third determining module, configured to determine that the course of the unmanned vehicle will be out of control if a value represented by the driving information is beyond the predefined boundary value corresponding to the driving information.

Further, the predefined boundary value includes a predefined boundary value corresponding to at least one piece of driving scenario information, and the second determining module includes:

an acquiring sub-module, configured to acquire driving scenario information of the unmanned vehicle; and a second determining sub-module, configured to determine a predefined boundary value corresponding to the driving information of the unmanned vehicle under the driving scenario information according to the driving information of the unmanned vehicle, the driving scenario information of the unmanned vehicle and the boundary value list, and the third determining module is specifically configured to:

determine that the course of the unmanned vehicle will be out of control if a value represented by the driving information of the unmanned vehicle is beyond the predefined boundary value corresponding to the driving information of the unmanned vehicle under the driving scenario information.

Further, the driving information is any one of: an acceleration, a deceleration, a vehicle response time, a speed, and location information of an obstacle.

A third aspect of the present application provides a controlling device, including: a transmitter, a receiver, a memory and a processor, where:

the memory is configured to store computer instructions, and the processor is configured to execute the computer instructions stored in the memory to implement the method for controlling an unmanned vehicle provided in any one of the implementations of the first aspect.

A fourth aspect of the present application provides a storage medium, including: a readable storage medium; and computer instructions which are stored in the readable storage medium and are configured to implement the method for controlling an unmanned vehicle provided in any one of the implementations of the first aspect.

According to the method, apparatus, device and storage medium for controlling an unmanned vehicle as provided in embodiments of the present application, unmanned vehicle monitoring information of the unmanned vehicle is acquired when it is determined that a course of the unmanned vehicle will be out of control; a safety level corresponding to the unmanned monitoring information is determined according to a predefined correspondence between unmanned vehicle monitoring information and a safety level; and the unmanned vehicle is controlled to drive according to the safety level corresponding to the unmanned monitoring information. Thus, upon determining that the unmanned vehicle has gone beyond a boundary of the autopilot, the problem is identified that the unmanned vehicle will encounter a danger in driving. Then, the autopilot process of the unmanned vehicle is demoted according to the severity of the danger, e.g., decelerated or adjusted in its direction, to avoid safety hazards.

BRIEF DESCRIPTION OF THE DRAWINGS

In order to more clearly illustrate the embodiments of the present application or the technical solutions in the prior art, the drawings required in describing the embodiments or the prior art will be briefly introduced below. Apparently, the drawings described in the following are for some embodiments of the present application, and other drawings can be obtained by those skilled in the art without paying any creative labor.

DETAILED DESCRIPTION OF THE EMBODIMENTS

In order to make objectives, technical solutions and advantages of embodiments of the present application clearer, the technical solutions in the embodiments of the present application will be described hereunder clearly and comprehensively with reference to accompanying drawings. Obviously, the described embodiments are only a part of embodiments of the present application, rather than all of them. Based on the embodiments of the present application, all other embodiments obtained by persons of ordinary skill in the art without making any creative effort shall fall within the protection scope of the present application.

Prior art employs a control algorithm to control an autopilot process of the unmanned vehicle, which accomplishes the autopilot for the unmanned vehicle. For instance, an anti-collision algorithm may be employed to test whether the unmanned vehicle is encountering an obstacle and whether collision will follow.

In prior art, once the control algorithm, which has been employed to control the unmanned vehicle, commits an error or inaccurate calculation, the autopilot process of the unmanned vehicle will be out of control, leading to dangers in driving the unmanned vehicle.

In view of the foregoing problems, the present application proposes a method, an apparatus, a device and a storage medium for controlling an unmanned vehicle, which may demote an autopilot process of the unmanned vehicle according to the severity of the danger, e.g., decelerated or adjusted in its direction, to avoid safety hazards. Now, the solution will be detailed via a few specific embodiments.

Figure 1:
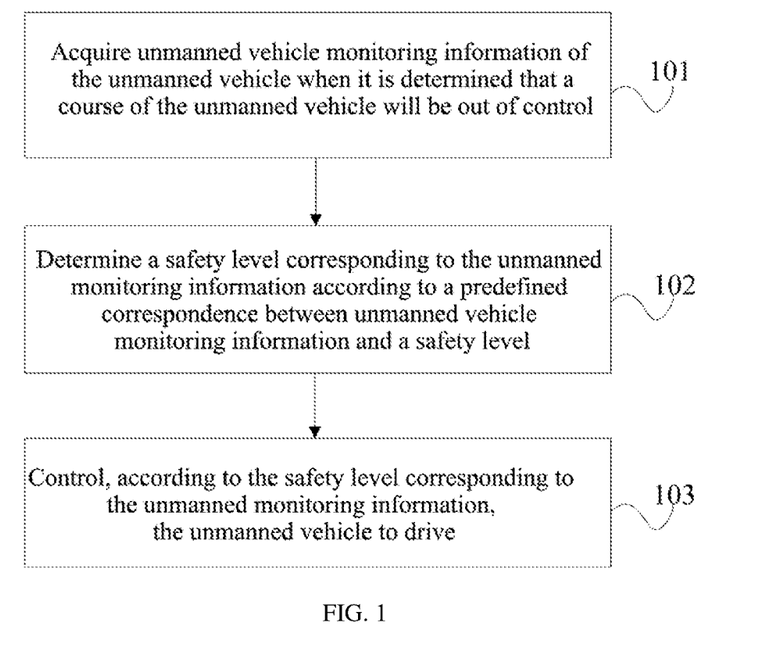
FIG. 1 is a flowchart of a method for controlling an unmanned vehicle as provided in an embodiment of the present application.

FIG. 1 is a flowchart of a method for controlling an unmanned vehicle as provided in an embodiment of the present application. As shown in FIG. 1, the executive subject entity for implementing the solution may be an unmanned vehicle controller, an unmanned vehicle controlling device, a controlling device for an autopilot system of an unmanned vehicle, etc. The method for controlling an unmanned vehicle includes the following.

Step 101: acquire unmanned vehicle monitoring information of the unmanned vehicle when it is determined that a course of the unmanned vehicle will be out of control.

Optionally, the unmanned vehicle monitoring information includes at least one of: a speed, a driving direction of the unmanned vehicle, location information of the unmanned vehicle, positioning frequency information, and an autopilot application status.

For this step, specifically, this embodiment will be explained with an unmanned vehicle controller being the executive subject entity for implementing the embodiment.

Upon detecting that the course of the unmanned vehicle will be out of control, e.g., deviating from a predefined driving course, overspeed, extreme acceleration, etc., the unmanned vehicle controller acquires unmanned vehicle monitoring information of the unmanned vehicle.

The unmanned vehicle monitoring information may be at least one of: a speed, a driving direction of the unmanned vehicle, location information of the unmanned vehicle, positioning frequency information, an autopilot application status, and obstacle information.

For instance, an unmanned vehicle has a speed, an acceleration and a deceleration during the course of driving. Thus, an unmanned vehicle controller may be informed of information about the acceleration, the deceleration, a vehicle response time, the speed, etc., according to a driving status of the unmanned vehicle.

For instance, an unmanned vehicle controller may identify location information of the unmanned vehicle and a driving direction of the unmanned vehicle via a global positioning system (GPS).

For instance, an unmanned vehicle controller may determine positioning frequency information according to the driving status of the unmanned vehicle and/or a system operating status of the unmanned vehicle autopilot system.

For instance, an unmanned vehicle controller may acquire operating statuses of various applications in the unmanned vehicle autopilot system, and then move on to derive the autopilot application status.

For instance, an unmanned vehicle may be equipped with a detecting apparatus, such as a lidar, that is capable of detecting surroundings of the unmanned vehicle. The detecting apparatus may scan around the unmanned vehicle for an obstacle, and acquire point cloud data of the obstacle, which represents the location of the obstacle. Thus, the unmanned vehicle controller may identify location information of the obstacle. The acceleration and speed of the obstacle may also be acquired via the detecting apparatus, such as a lidar.

For instance, an unmanned vehicle may be provided with an image apparatus which is capable of acquiring image information around the unmanned vehicle. An unmanned vehicle controller applies image recognition and obstacle detection to the image information to identify the location information of the obstacle.

Step 102: determine a safety level corresponding to the unmanned monitoring information according to a predefined correspondence between unmanned vehicle monitoring information and a safety level.

For this step, specifically, an unmanned vehicle controller may store thereon a correspondence between various unmanned vehicle monitoring information and various safety levels. Then, from the correspondence, the unmanned vehicle controller may find out a safety level corresponding to the acquired unmanned monitoring information.

For instance, an unmanned vehicle controller may store that unmanned vehicle monitoring information 1 corresponds to a safety level 1, unmanned vehicle monitoring information 2 corresponds to a safety level 2 and unmanned vehicle monitoring information 3 corresponds to a safety level 3. Thus, from the correspondence, the unmanned vehicle controller may find out that it is the safety level 2 that corresponds to the unmanned monitoring information 2.

For instance, an unmanned vehicle controller may store that a speed 1 corresponds to the safety level 1, a speed 2 corresponds to the safety level 2, a driving direction 1 corresponds to the safety level 3, and a driving direction 2 corresponds to the safety level 4. Thus, upon determining that the unmanned vehicle is at the speed 2, the unmanned vehicle controller may move on to decide on the safety level 2, which corresponds to the speed 2.

Step 103: control, according to the safety level corresponding to the unmanned monitoring information, the unmanned vehicle to drive.

For this step, specifically, an unmanned vehicle controller controls the driving speed, the direction, etc., of the unmanned vehicle according to the acquired safety level corresponding to the unmanned monitoring information.

For instance, an unmanned vehicle controller may store that the speed 1 corresponds to the safety level 1, the speed 2 corresponds to the safety level 2, the driving direction 1 corresponds to the safety level 3, and the driving direction 2 corresponds to the safety level 4. Thus, upon determining that the unmanned vehicle is at the speed 2, the unmanned vehicle controller may move on to decide on the safety level 2, which corresponds to the speed 2. Since the safety level 2 represents the speed 3, the unmanned vehicle controller controls the unmanned vehicle according to the speed 3, causing the unmanned vehicle to run at the speed 3.

According to this embodiment, unmanned vehicle monitoring information of the unmanned vehicle is acquired when it is determined that a course of the unmanned vehicle will be out of control; a safety level corresponding to the unmanned monitoring information is determined according to a predefined correspondence between unmanned vehicle monitoring information and a safety level; and the unmanned vehicle is controlled to drive according to the safety level corresponding to the unmanned monitoring information. Thus, upon determining that the unmanned vehicle has gone beyond a boundary of the autopilot, the problem is identified that the unmanned vehicle will encounter a danger in driving. Then, the autopilot process of the unmanned vehicle is demoted according to the severity of the danger, e.g., decelerated or adjusted in its direction, to avoid safety hazards.

Figure 2:
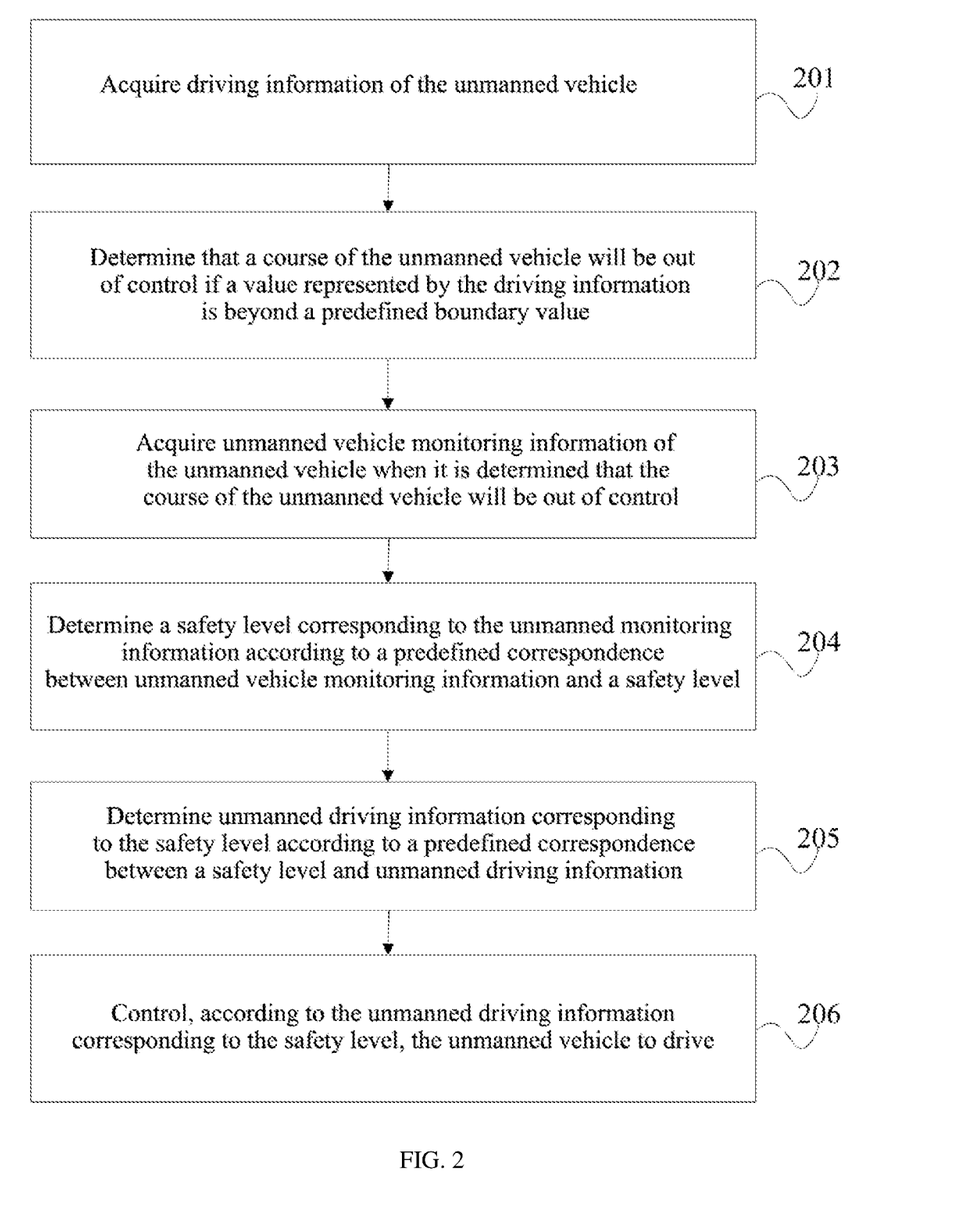
FIG. 2 is a flowchart of another method for controlling an unmanned vehicle as provided in an embodiment of the present application.

FIG. 2 is a flowchart of another method for controlling an unmanned vehicle as provided in an embodiment of the present application. As shown in FIG. 2, the executive subject entity for implementing the solution may be an unmanned vehicle controller, an unmanned vehicle controlling device, a controlling device for the autopilot system of an unmanned vehicle, etc. The method for controlling an unmanned vehicle includes the following.

Step 201: acquire driving information of the unmanned vehicle.

Optionally, the driving information is any one of: an acceleration, a deceleration, a vehicle response time, a speed, and location information of an obstacle.

For this step, specifically, this embodiment will be explained with an unmanned vehicle controller being the executive subject entity for implementing the embodiment.

When an unmanned vehicle is driving, e.g., driving forward or making a turn, an unmanned vehicle controller acquires driving information of the unmanned vehicle, where the driving information is any one of: an acceleration of the unmanned vehicle, a deceleration of the unmanned vehicle, a vehicle response time of the unmanned vehicle, a speed of the unmanned vehicle, and location information of the obstacle around the unmanned vehicle.

Step 202: determine that a course of the unmanned vehicle will be out of control if a value represented by the driving information is beyond a predefined boundary value.

For this step, specifically, predefined boundary values are configured for various driving information. An unmanned vehicle controller may determine whether the acquired driving information represents a value that is beyond the predefined boundary value. If the unmanned vehicle controller determines that the acquired driving information does represent a value beyond the predefined boundary value, it may determine that the course of the unmanned vehicle will be out of control.

For instance, when the driving information is an acceleration, the predefined boundary value is the maximum acceleration; when the driving information is a deceleration, the predefined boundary value is the maximum deceleration; when the driving information is a vehicle response time, the predefined boundary value is the maximum vehicle response time; when the driving information is a speed, the predefined boundary value is the maximum speed; and when the driving information is location information of the obstacle, the predefined boundary value is a safety distance between the unmanned vehicle and the obstacle.

A first implementation for the Step 202 may be: set an acceleration of the unmanned vehicle to be the driving information; and determine that the course of the unmanned vehicle will be out of control if the acceleration is above a predefined maximum acceleration or below a predefined minimum acceleration.

Specifically, the acceleration of the unmanned vehicle is acquired by the unmanned vehicle controller, and the maximum and minimum accelerations are stored in the unmanned vehicle controller. The unmanned vehicle controller determines whether the acceleration of the unmanned vehicle is above the maximum acceleration. If the unmanned vehicle controller determines that the acceleration of the unmanned vehicle is indeed above the maximum acceleration, it determines that the course of the unmanned vehicle will be out of control. Or, the unmanned vehicle controller determines whether the acceleration of the unmanned vehicle is below the minimum acceleration. If the unmanned vehicle controller determines that the acceleration of the unmanned vehicle is indeed below the minimum acceleration, it determines that the course of the unmanned vehicle will be out of control.

A second implementation for the Step 202 may be: set a speed to be the driving information of the unmanned vehicle; and determine that the course of the unmanned vehicle will be out of control if the speed is above a predefined maximum speed or below a predefined minimum speed.

Specifically, the speed of the unmanned vehicle is acquired by the unmanned vehicle controller. The maximum and minimum speeds are stored in the unmanned vehicle controller. The unmanned vehicle controller determines whether the speed of the unmanned vehicle is above the maximum speed. If the unmanned vehicle controller determines that the speed of the unmanned vehicle is indeed above the maximum speed, it determines that the course of the unmanned vehicle will be out of control. The unmanned vehicle controller determines whether the speed of the unmanned vehicle is below the minimum speed. If the unmanned vehicle controller determines that the speed of the unmanned vehicle is indeed below the minimum speed, it determines that the course of the unmanned vehicle will be out of control.

A third implementation for the Step 202 may be: set location information of an obstacle to be the driving information; determine a distance value between the obstacle and the unmanned vehicle according to the location information of the obstacle; and determine that the course of the unmanned vehicle will be out of control if the distance value is below a predefined safety distance.

Specifically, the unmanned vehicle controller may: acquire the location information of the obstacle; identify location information of the unmanned vehicle via a GPS; calculate the distance value between the obstacle and the unmanned vehicle according to the location information of the obstacle and the location information of the unmanned vehicle; store a safety distance therein; determine whether the distance value is below the safety distance; and determine that the course of the unmanned vehicle will be out of control if the distance value is below the safety distance.

A fourth implementation for the Step 202 may be: set a vehicle response time of the unmanned vehicle to be the driving information; and determine that the course of the unmanned vehicle will be out of control if the vehicle response time is above a predefined response time.

Specifically, the unmanned vehicle controller may: acquire vehicle response a time of the unmanned vehicle; store a response time threshold; determine whether the vehicle response time is above the response time; determine that the unmanned vehicle is responding too slowly if the vehicle response time is determined to be above the response time; and determine that the course of the unmanned vehicle will be out of control.

A fifth implementation for the Step 202 may be: set a deceleration to be the driving information of the unmanned vehicle; and determine that the course of the unmanned vehicle will be out of control if the deceleration is above a predefined maximum deceleration or below a predefined minimum deceleration.

Specifically, the deceleration of the unmanned vehicle is acquired by the unmanned vehicle controller, and the maximum and minimum decelerations are stored in the unmanned vehicle controller. The unmanned vehicle controller may: determine whether the deceleration of the unmanned vehicle is above a maximum deceleration; determine that the course of the unmanned vehicle will be out of control if the deceleration of the unmanned vehicle is above a maximum deceleration; determine whether the deceleration of the unmanned vehicle is below a minimum deceleration; determine that the course of the unmanned vehicle will be out of control if the deceleration of the unmanned vehicle is below the minimum deceleration.

Optionally, the Step 202 may specifically include Steps 2021-2022:

Step 2021: determine a predefined boundary value corresponding to the driving information according to a predefined boundary value list, where the boundary value list includes at least one piece of driving information, and each of the at least one piece of driving information has a predefined boundary value.

Step 2022: determine that the course of the unmanned vehicle will be out of control if a value represented by the driving information is beyond the predefined boundary value corresponding to the driving information.

Optionally, the predefined boundary value includes a predefined boundary value corresponding to at least one piece of driving scenario information, and Steps 2021-2022 may be specifically implemented as the following:

acquiring driving scenario information of the unmanned vehicle;

determining a predefined boundary value corresponding to the driving information of the unmanned vehicle under the driving scenario information according to the driving information of the unmanned vehicle, the driving scenario information of the unmanned vehicle and the boundary value list, and determining that the course of the unmanned vehicle will be out of control if a value represented by the driving information of the unmanned vehicle is beyond the predefined boundary value corresponding to the driving information of the unmanned vehicle under the driving scenario information.

Specifically, the unmanned vehicle controller stores a boundary value list that includes one or more pieces of driving information, where each piece of driving information has a predefined boundary value. The unmanned vehicle controller may find out the predefined boundary value corresponding to the driving information of the unmanned vehicle according to the boundary value list. The unmanned vehicle controller may determine whether the acquired driving information is beyond the predefined boundary value corresponding to the driving information. If the unmanned vehicle controller determines that the acquired driving information does represent a value that is beyond the predefined boundary value corresponding to the driving information, it may determine that the course of the unmanned vehicle will be out of control.

For instance, a boundary value list includes driving information 1, driving information 2, driving information 3, driving information 4, where the driving information 1 has a predefined boundary value 1, the driving information 2 has a predefined boundary value 2, the driving information 3 has a predefined boundary value 3, and the driving information 4 has a predefined boundary value 4.

For instance, the unmanned vehicle controller acquires an acceleration of the unmanned vehicle as the driving information, hence the predefined boundary value corresponding to the acceleration of the unmanned vehicle is the maximum and/or minimum acceleration.

For instance, the unmanned vehicle controller acquires a speed of the unmanned vehicle as the driving information, hence the predefined boundary value corresponding to the speed is the maximum and/or minimum speed.

For instance, the unmanned vehicle controller acquires an acceleration of an obstacle as the driving information, hence the predefined boundary value corresponding to the acceleration of the obstacle is the maximum and/or minimum acceleration.

For instance, the unmanned vehicle controller acquires a speed of an obstacle as the driving information, hence the predefined boundary value corresponding to the speed of the obstacle is the maximum and/or minimum speed.

For Steps 2021-2022, specifically, the unmanned vehicle controller stores a boundary value list that includes at least one piece of driving scenario information, each of which has at least one piece of driving information, where each piece of driving information has a boundary value. It can be known that the same driving information may be evaluated differently in terms of its predefined boundary values in different scenarios. For instance, when the unmanned vehicle is driving forward, the predefined boundary value corresponding to the driving information shall be evaluated at a first value. But when the unmanned vehicle is making a turn, the predefined boundary value corresponding to the driving information shall be evaluated at a second value.

The unmanned vehicle controller derives the driving scenario information of the unmanned vehicle according to the driving status and/or environment information of the unmanned vehicle. The driving status includes an acceleration status, a deceleration status, a steering status, etc., of the unmanned vehicle. The environment information includes image information, noise information, etc., of the environment in which the unmanned vehicle is located. The driving scenario information includes scenarios such as driving forward, steering, dodging an obstacle, accelerated driving, decelerated driving, braking, etc.

For instance, an unmanned vehicle controller may identify the unmanned vehicle to be in an acceleration status, and hence determine the driving scenario information of the unmanned vehicle to be the accelerated driving scenario.

For another instance, an unmanned vehicle controller may identify the unmanned vehicle to be in a steering status, and an obstacle is represented in the image information of the environment in which the unmanned vehicle is located. Hence, the unmanned vehicle controller determines the driving scenario information of the unmanned vehicle to be the dodging obstacle scenario.

For still another instance, an unmanned vehicle controller may identify that police siren is represented in the noise information of the environment in which the unmanned vehicle is located. Hence, the unmanned vehicle controller determines the driving scenario information of the unmanned vehicle to be the decelerated driving scenario.

The unmanned vehicle controller retrieves the boundary value list according to the driving scenario information of the unmanned vehicle to derive various driving information under the driving scenario information of the unmanned vehicle. Then, the unmanned vehicle controller derives the predefined boundary value corresponding to the driving information of the unmanned vehicle under the driving scenario information of the unmanned vehicle. Then, the unmanned vehicle controller determines that the course of the unmanned vehicle will be out of control if a value represented by the driving information of the unmanned vehicle is beyond the predefined boundary value thus retrieved.

For instance, in a boundary value list, driving scenario information 1 has driving information a, driving information b, driving information c; driving scenario information 2 has driving information a, driving information b, driving information c; driving scenario information 3 has driving information a, driving information b, driving information c, where the driving information a under the driving scenario information 1 has a predefined boundary value A1, the driving information b under the driving scenario information 1 has a predefined boundary value B1, the driving information c under the driving scenario information 1 has a predefined boundary value C1, the driving information a under the driving scenario information 2 has a predefined boundary value A2, the driving information b under the driving scenario information 2 has a predefined boundary value B2, the driving information c under the driving scenario information 2 has a predefined boundary value C2, the driving information a under the driving scenario information 3 has a predefined boundary value A3, the driving information b under the driving scenario information 3 has a predefined boundary value B3, and the driving information c under the driving scenario information 3 has a predefined boundary value C3. The unmanned vehicle controller may determine the driving scenario information of the unmanned vehicle to be 2. Since the unmanned vehicle controller has acquired the driving information of the unmanned vehicle to be b, it may determine B2 to be the predefined boundary value for the driving information b under the driving scenario information 2. If the unmanned vehicle controller determines that the driving information b represents a value above B2, it may determine that the course of the unmanned vehicle will be out of control.

For instance, in the boundary value list, the driving forward scenario has an acceleration, a vehicle response time and a speed; the steering scenario has an acceleration, a vehicle response time and a speed, where the acceleration under the driving forward scenario has a first maximum acceleration, the vehicle response time under the driving forward scenario has a first response time; the speed under the driving forward scenario has a first maximum speed, the acceleration under the steering scenario has a second maximum acceleration, the vehicle response time under the steering scenario has a second response time, and the speed under the steering scenario has a second maximum speed. The unmanned vehicle controller may determine the driving scenario information of the unmanned vehicle to be the driving forward scenario. Since the unmanned vehicle controller has acquired the speed of the unmanned vehicle, it may determine the first maximum speed to be the predefined boundary value for the speed in the driving forward scenario. If the unmanned vehicle controller determines that the speed of the unmanned vehicle is above the first maximum speed, it may determine that the course of the unmanned vehicle will be out of control.

Step 203: acquire unmanned vehicle monitoring information of the unmanned vehicle when it is determined that the course of the unmanned vehicle will be out of control.

For this step, specifically, reference may be made to the Step 101 in FIG. 1, which will not be repeated herein.

Step 204: determine a safety level corresponding to the unmanned monitoring information according to a predefined correspondence between unmanned vehicle monitoring information and a safety level.

For this step, specifically, reference may be made to the Step 102 in FIG. 1, which will not be repeated herein.

Step 205: determine unmanned driving information corresponding to the safety level according to a predefined correspondence between a safety level and unmanned driving information.

Optionally, the unmanned vehicle monitoring information includes at least one of: a changed speed, a changed driving direction, changed location information, and a changed positioning frequency.

For this step, specifically, an unmanned vehicle controller may store therein a correspondence between various safety levels and various unmanned vehicle driving information. Then, from the correspondence, the unmanned vehicle controller may find out the unmanned vehicle driving information corresponding to the acquired safety level. It can be known that there is a correspondence among the unmanned vehicle monitoring information, the safety level and the unmanned vehicle driving information.

For instance, an unmanned vehicle controller may store that unmanned vehicle monitoring information 1 corresponds to a safety level 1, unmanned vehicle monitoring information 2 corresponds to a safety level 2 and unmanned vehicle monitoring information 3 corresponds to a safety level 3. Thus, the unmanned vehicle controller may determine that it is the safety level 2 that corresponds to the unmanned monitoring information 2. The unmanned vehicle controller may store that the safety level 1 corresponds to the driving information 1, the safety level 2 corresponds to the driving information 2, and the safety level 3 corresponds to the driving information 3. Thus, the unmanned vehicle controller may determine the unmanned driving information 2 to be corresponding to the safety level 2.

For instance, an unmanned vehicle controller may store that a speed 1 corresponds to a safety level 1, a speed 2 corresponds to a safety level 2, a driving direction 1 corresponds to a safety level 3, and a driving direction 2 corresponds to a safety level 4. Thus, upon determining that the unmanned vehicle is at the speed 2, the unmanned vehicle controller may move on to decide on the safety level 2, which corresponds to the speed 2. The unmanned vehicle controller stores that the safety level 1 corresponds to a first speed, the safety level 2 corresponds to a second speed, the safety level 3 corresponds to a first direction, and the safety level 4 corresponds to a second direction. The unmanned vehicle controller may determine the second speed to be corresponding to the safety level 2. Then, it may determine it necessary to adjust the speed of the unmanned vehicle to the second speed.

For instance, upon determining that a course of the unmanned vehicle will be out of control, a speed a of the unmanned vehicle is acquired, the safety level corresponding to the speed is determined to be the second level, and a speed b, which is below the speed a, is determined to be corresponding to the second level. The unmanned vehicle controller controls the unmanned vehicle according to the speed a, and then decelerates the unmanned vehicle.

For instance, an unmanned vehicle controller may store that the speed 1 corresponds to the safety level 1, the speed 2 corresponds to the safety level 2, the driving direction 1 corresponds to the safety level 3, and the driving direction 2 corresponds to the safety level 4. Thus, upon determining that the unmanned vehicle is in the driving direction 1, the unmanned vehicle controller may move on to decide on the safety level 3, which corresponds to the driving direction 1. The unmanned vehicle controller stores that the safety level 1 corresponds to a first speed, the safety level 2 corresponds to a second speed, the safety level 3 corresponds to a first direction, and the safety level 4 corresponds to a second direction. The unmanned vehicle controller may determine the first direction to be corresponding to the safety level 3. Then, it may determine it necessary to adjust the driving direction of the unmanned vehicle to the first direction.

Step 206: control, according to the unmanned driving information corresponding to the safety level, the unmanned vehicle to drive.

The Step 206 specifically include:

Step 2061: determine an autopilot controlling apparatus corresponding to the safety level according to a predefined correspondence between a safety level and an autopilot controlling apparatus;

Step 2062: transmit the unmanned driving information corresponding to the safety level to the autopilot controlling apparatus corresponding to the safety level to cause the autopilot controlling apparatus corresponding to the safety level to control driving of the unmanned vehicle.

For this step, specifically, various safety levels correspond to various autopilot controlling apparatuses. For the same driving behavior, different autopilot controlling apparatuses may serve the same function, but at different costs, and/or power consumptions.

The unmanned vehicle controller determines the autopilot controlling apparatus corresponding to the safety level, and then uses the autopilot controlling apparatus corresponding to the safety level to control the driving of the unmanned vehicle according to the unmanned driving information corresponding to the safety level.

For instance, the safety level 1 corresponds to an autopilot controlling apparatus 1, the safety level 2 corresponds to an autopilot controlling apparatus 2, and the safety level 3 corresponds to an autopilot controlling apparatus 3. The unmanned vehicle controller identifies the safety level 2, and identifies the unmanned driving information 2 to be corresponding to the safety level 2. The unmanned vehicle controller determines the autopilot controlling apparatus 2 corresponding to the safety level 2, transmits the unmanned driving information 2 to the autopilot controlling apparatus 2 which, in turn, controls the driving of the unmanned vehicle according to the unmanned driving information 2.

For instance, the unmanned vehicle controller identifies the safety level 2, and determines the second speed to be corresponding to the safety level 2. The safety level 1 corresponds to the autopilot controlling apparatus 1, the safety level 2 corresponds to the autopilot controlling apparatus 2, and the safety level 3 corresponds to the autopilot controlling apparatus 3. The unmanned vehicle controller may determine the autopilot controlling apparatus 2 to be corresponding to the safety level 2. The unmanned vehicle controller transmits the second speed to the autopilot controlling apparatus 2 which, in turn, adjusts the speed of the unmanned vehicle to the second speed.

According to this embodiment, unmanned vehicle monitoring information of the unmanned vehicle is acquired when it is determined that a course of the unmanned vehicle will be out of control, where the unmanned vehicle monitoring information includes at least one of: a speed, location information of the unmanned vehicle, positioning frequency information, and an autopilot application status; a safety level corresponding to the unmanned vehicle monitoring information is identified, and unmanned vehicle driving information corresponding to the safety level is identified, where a correspondence exists among the unmanned vehicle monitoring information, the safety level and the unmanned vehicle driving information. Then, the autopilot controlling apparatus corresponding to the safety level is brought in to control the driving of the unmanned vehicle according to the unmanned driving information corresponding to the safety level. Thus, upon determining that the unmanned vehicle has gone beyond a boundary of the autopilot, the problem is identified that the unmanned vehicle will encounter a danger in driving. Then, the autopilot process of the unmanned vehicle is demoted according to the severity of the danger, e.g., decelerated or adjusted in its direction, to avoid safety hazards. Moreover, the unmanned vehicle is controlled by an autopilot controlling apparatus corresponding to the safety level. For the same driving behavior, different autopilot controlling apparatuses may serve the same function, but at different costs, and/or power consumption. By bringing in an autopilot controlling apparatus with low power consumption when the safety level is low, power conservation can be ensured for the unmanned vehicle.

Figure 3:
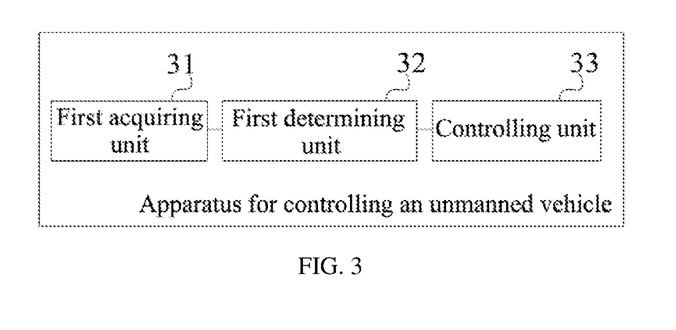
FIG. 3 is a structural diagram of an apparatus for controlling an unmanned vehicle as provided in an embodiment of the present application.

FIG. 3 is a structural diagram of an apparatus for controlling an unmanned vehicle as provided in an embodiment of the present application. As shown in FIG. 3, an apparatus for controlling an unmanned vehicle as provided in this embodiment includes:

a first acquiring unit 31, configured to acquire unmanned vehicle monitoring information of the unmanned vehicle when it is determined that a course of the unmanned vehicle will be out of control;

a first determining unit 32, configured to determine a safety level corresponding to the unmanned monitoring information according to a predefined correspondence between unmanned vehicle monitoring information and a safety level; and a controlling unit 33, configured to control the unmanned vehicle to drive according to the safety level corresponding to the unmanned monitoring information.

The apparatus for controlling an unmanned vehicle as provided in this embodiment follows an operational principle similar to the technical solutions in the method for controlling an unmanned vehicle as provided in any one of the foregoing embodiments, which will not be repeated herein.

According to this embodiment, unmanned vehicle monitoring information of the unmanned vehicle is acquired when it is determined that a course of the unmanned vehicle will be out of control; a safety level corresponding to the unmanned monitoring information is determined according to a predefined correspondence between unmanned vehicle monitoring information and a safety level; and the unmanned vehicle is controlled to drive according to the safety level corresponding to the unmanned monitoring information. Thus, upon determining that the unmanned vehicle has gone beyond a boundary of the autopilot, the problem is identified that the unmanned vehicle will encounter a danger in driving. Then, the autopilot process of the unmanned vehicle is demoted according to the severity of the danger, e.g., decelerated or adjusted in its direction, to avoid safety hazards.

Figure 4:
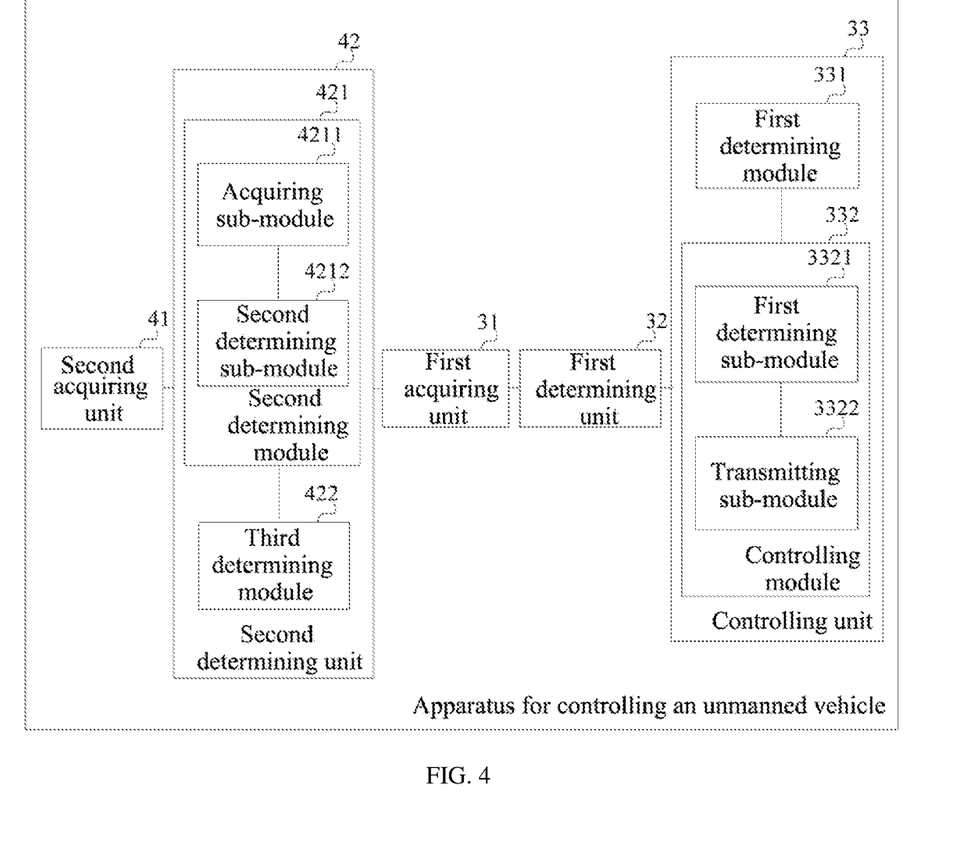
FIG. 4 is a structural diagram of another apparatus for controlling an unmanned vehicle as provided in an embodiment of the present application.

FIG. 4 is a structural diagram of another apparatus for controlling an unmanned vehicle as provided in an embodiment of the present application. On the basis of the embodiment as shown in FIG. 3, as shown in FIG. 4, in the apparatus for controlling an unmanned vehicle as provided in this embodiment, the controlling unit 33 includes:

a first determining module 331, configured to determine unmanned driving information corresponding to the safety level according to a predefined correspondence between a safety level and unmanned driving information; and a controlling module 332, configured to control, according to the unmanned driving information corresponding to the safety level, the unmanned vehicle to drive.

The controlling module 332 may include:

a first determining sub-module 3321, configured to determine an autopilot controlling apparatus corresponding to the safety level according to a predefined correspondence between a safety level and an autopilot controlling apparatus; and a transmitting sub-module 3322, configured to transmit the unmanned driving information corresponding to the safety level to the autopilot controlling apparatus corresponding to the safety level to cause the autopilot controlling apparatus corresponding to the safety level to control driving of the unmanned vehicle.

The unmanned vehicle monitoring information may include at least one of: a speed, a driving direction of the unmanned vehicle, location information of the unmanned vehicle, positioning frequency information, and an autopilot application status.

The unmanned vehicle monitoring information may include at least one of: a changed speed, a changed driving direction, changed location information, and a changed positioning frequency.

The apparatus provided in this embodiment further includes:

a second acquiring unit 41, configured to acquire driving information of the unmanned vehicle before the first acquiring unit 31 acquires unmanned vehicle monitoring information of the unmanned vehicle when it has determined that a course of the unmanned vehicle will be out of control; and a second determining unit 42, configured to determine that the course of the unmanned vehicle will be out of control if a value represented by the driving information is beyond a predefined boundary value.

The second determining unit 42 includes:

a second determining module 421, configured to determine a predefined boundary value corresponding to the driving information according to a predefined boundary value list, where the boundary value list includes at least one piece of driving information, and each of the at least one piece of driving information has a predefined boundary value; and a third determining module 422, configured to determine that the course of the unmanned vehicle will be out of control if a value represented by the driving information is beyond the predefined boundary value corresponding to the driving information.

The predefined boundary value may include a predefined boundary value corresponding to at least one piece of driving scenario information. The second determining module 421 may include:

an acquiring sub-module 4211, configured to acquire driving scenario information of the unmanned vehicle; and a second determining sub-module 4212, configured to determine a predefined boundary value corresponding to the driving information of the unmanned vehicle under the driving scenario information according to the driving information of the unmanned vehicle, the driving scenario information of the unmanned vehicle and the boundary value list, and the third determining module 422 is specifically configured to determine that the course of the unmanned vehicle will be out of control if a value represented by the driving information of the unmanned vehicle is beyond the predefined boundary value corresponding to the driving information of the unmanned vehicle under the driving scenario information.

The driving information may be any one of: an acceleration, a deceleration, a vehicle response time, a speed, and location information of an obstacle.

The apparatus for controlling an unmanned vehicle as provided in this embodiment follows an operational principle similar to the technical solutions in the method for controlling an unmanned vehicle as provided in any one of the foregoing embodiments, which will not be repeated herein.

According to this embodiment, unmanned vehicle monitoring information of the unmanned vehicle is acquired when it is determined that a course of the unmanned vehicle will be out of control, where the unmanned vehicle monitoring information includes at least one of: a speed, location information of the unmanned vehicle, positioning frequency information, and autopilot application status; a safety level corresponding to the unmanned vehicle monitoring information is identified, and unmanned vehicle driving information corresponding to the safety level is identified, where a correspondence exists among the unmanned vehicle monitoring information, the safety level and the unmanned vehicle driving information. Then, the autopilot controlling apparatus corresponding to the safety level is brought in to control the driving of the unmanned vehicle according to the unmanned driving information corresponding to the safety level. Thus, upon determining that the unmanned vehicle has gone beyond a boundary of the autopilot, the problem is identified that the unmanned vehicle will encounter a danger in driving. Then, the autopilot process of the unmanned vehicle is demoted according to the severity of the danger, e.g., decelerated or adjusted in its direction, to avoid safety hazards. Moreover, the unmanned vehicle is controlled by an autopilot controlling apparatus corresponding to the safety level. For the same driving behavior, different autopilot controlling apparatuses may serve the same function, but at different costs, and/or power consumption. By bringing in an autopilot controlling apparatus with low power consumption when the safety level is low, power conservation can be ensured for the unmanned vehicle.

Figure 5:
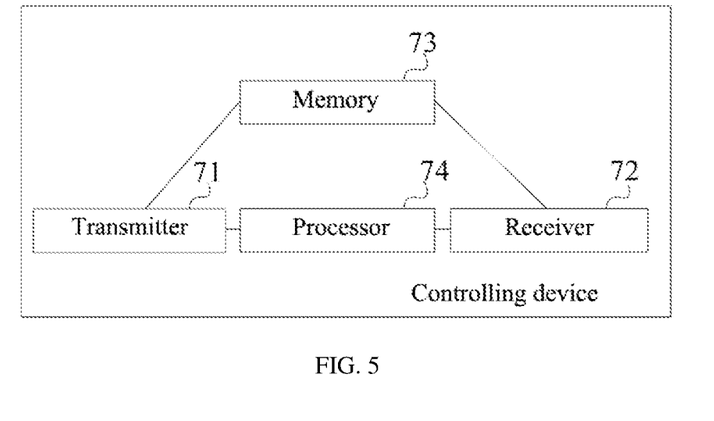
FIG. 5 is a structural diagram of a controlling device as provided in an embodiment of the present application.

FIG. 5 is a structural diagram of a controlling device as provided in an embodiment of the present application. As shown in FIG. 5, the controlling device includes: a transmitter 71, a receiver 72, a memory 73 and a processor 74, where:

the memory 73 is configured to store computer instructions, and the processor 74 is configured to execute the computer instructions stored in the memory 73 to implement the technical solution according to the method for controlling an unmanned vehicle as provided in any one of the foregoing embodiments.

The present application also provides a storage medium, including: a readable storage medium and computer instructions stored thereon, the computer instructions being configured to implement the technical solution according to the method for controlling an unmanned vehicle as provided in any one of the foregoing implementations.

In specific implementations of the foregoing devices, it should be understood that the processor 74 may be a central processing unit (CPU) and may also be other general purpose processors, digital signal processors (DSP), and/or application specific integrated circuits (ASIC). The general purpose processor may be a microprocessor or the processor or any conventional processor or the like. The steps of the method disclosed with reference to the embodiments of the present application may be directly embodied by the execution of the hardware processor or by a combination of hardware and software modules in the processor.

It will be understood by those skilled in the art that all or part of the steps of the foregoing method embodiments may be implemented by hardware in relation to program instructions. The program may be stored in a computer readable storage medium. When being executed, the program implements steps included in various method embodiments as described in the foregoing. The storage medium may include: a read-only memory (ROM), a random-access memory (RAM), a flash memory, a hard drive, a solid state drive, a magnetic tape, a floppy disk, an optical disc and/or any combination thereof.

Finally, it should be noted that the foregoing embodiments are merely intended for describing, rather than limiting, the technical solutions of the present disclosure. Although the present disclosure is described in detail with reference to the foregoing embodiments, persons of ordinary skill in the art should understand that they may still make modifications to the technical solutions described in the foregoing embodiments, or make equivalent replacements to some or all technical features therein; however, these modifications or replacements do not make the essence of corresponding technical solutions depart from the scope of the technical solutions in the embodiments of the present disclosure.

What is claimed is:

1. A method for controlling an unmanned vehicle, comprising:
   acquiring driving information of the unmanned vehicle;
   determining that the course of the unmanned vehicle will be out of control if a value represented by the driving information is beyond a predefined boundary value;
   acquiring unmanned vehicle monitoring information of the unmanned vehicle when it is determined that the course of the unmanned vehicle will be out of control;
   determining a safety level corresponding to the unmanned vehicle monitoring information according to a predefined correspondence between the unmanned vehicle monitoring information and the safety level; and
   controlling, according to the safety level corresponding to the unmanned vehicle monitoring information, the unmanned vehicle to drive,
   wherein the controlling, according to the safety level corresponding to the unmanned vehicle monitoring information, the unmanned vehicle to drive further comprises:
   determining unmanned driving information corresponding to the safety level according to a predefined correspondence between a safety level and unmanned driving information; and
   controlling, according to the unmanned driving information corresponding to the safety level, the unmanned vehicle to drive, and
   wherein the controlling, according to the unmanned driving information corresponding to the safety level, the unmanned vehicle to drive further comprises:
   determining an autopilot controlling apparatus corresponding to the safety level according to a predefined correspondence between a safety level and an autopilot controlling apparatus; and
   transmitting the unmanned driving information corresponding to the safety level to the autopilot controlling apparatus corresponding to the safety level to cause the autopilot controlling apparatus corresponding to the safety level to control driving of the unmanned vehicle, wherein an autopilot controlling apparatus with low power consumption is brought in when the safety level is low.

2. The method according to claim 1, wherein the unmanned vehicle monitoring information comprises at least one of: a speed, a driving direction of the unmanned vehicle, location information of the unmanned vehicle, positioning frequency information, and an autopilot application status.

3. The method according to claim 2, wherein the unmanned driving information comprises at least one of: a changed speed, a changed driving direction, changed location information, and a changed positioning frequency.

4. The method according to claim 1, wherein the determining that the course of the unmanned vehicle will be out of control if a value represented by the driving information is beyond a predefined boundary value comprises:
   determining a predefined boundary value corresponding to the driving information according to a predefined boundary value list, wherein the boundary value list comprises at least one piece of driving information, and each of the at least one piece of driving information has a predefined boundary value; and
   determining that the course of the unmanned vehicle will be out of control if a value represented by the driving information is beyond the predefined boundary value corresponding to the driving information.

5. The method according to claim 4, wherein the predefined boundary value comprises a predefined boundary value corresponding to at least one piece of driving scenario information, and
   wherein the determining a predefined boundary value corresponding to the driving information according to a predefined boundary value list comprises:

acquiring driving scenario information of the unmanned vehicle;

determining a predefined boundary value corresponding to the driving information of the unmanned vehicle under the driving scenario information according to the driving information of the unmanned vehicle, the driving scenario information of the unmanned vehicle and the boundary value list, and wherein the determining that the course of the unmanned vehicle will be out of control if a value represented by the driving information is beyond the predefined boundary value corresponding to the driving information comprises:

determining that the course of the unmanned vehicle will be out of control if a value represented by the driving information of the unmanned vehicle is beyond the predefined boundary value corresponding to the driving information of the unmanned vehicle under the driving scenario information.

6. The method according to claim 1, wherein the driving information is any one of: an acceleration, a deceleration, a vehicle response time, a speed, and location information of an obstacle.

7. An apparatus for controlling an unmanned vehicle, comprising a processor and a memory storing instructions thereon, wherein the processor is, when executing the instructions, configured to:

acquire driving information of the unmanned vehicle;

determine that the course of the unmanned vehicle will be out of control if a value represented by the driving information is beyond a predefined boundary value;

acquire unmanned vehicle monitoring information of the unmanned vehicle when it is determined that a course of the unmanned vehicle will be out of control;

determine a safety level corresponding to the unmanned vehicle monitoring information according to a predefined correspondence between the unmanned vehicle monitoring information and the safety level;

control, according to the safety level corresponding to the unmanned vehicle monitoring information, the unmanned vehicle to drive;

wherein the processor is further configured to:

determine unmanned driving information corresponding to the safety level according to a predefined correspondence between a safety level and unmanned driving information; and control, according to the unmanned driving information corresponding to the safety level, the unmanned vehicle to drive; and wherein the processor is further configured to:

determine an autopilot controlling apparatus corresponding to the safety level according to a predefined correspondence between a safety level and an autopilot controlling apparatus; and transmit the unmanned driving information corresponding to the safety level to the autopilot controlling apparatus corresponding to the safety level to cause the autopilot controlling apparatus corresponding to the safety level to control driving of the unmanned vehicle, wherein an autopilot controlling apparatus with low power consumption is brought in when the safety level is low.

8. The apparatus according to claim 7, wherein the unmanned vehicle monitoring information comprises at least one of: a speed, a driving direction of the unmanned vehicle, location information of the unmanned vehicle, positioning frequency information, and an autopilot application status.

9. The apparatus according to claim 8, wherein the unmanned driving information comprises at least one of: a changed speed, a changed driving direction, changed location information, and a changed positioning frequency.

10. The apparatus according to claim 7, wherein the processor is further configured to:

determine a predefined boundary value corresponding to the driving information according to a predefined boundary value list, wherein the boundary value list comprises at least one piece of driving information, and each of the at least one piece of driving information has a predefined boundary value; and determine that the course of the unmanned vehicle will be out of control if a value represented by the driving information is beyond the predefined boundary value corresponding to the driving information.

11. The apparatus according to claim 10, wherein the predefined boundary value comprises a predefined boundary value corresponding to at least one piece of driving scenario information, and the processor is further configured to:

acquire driving scenario information of the unmanned vehicle; and determine a predefined boundary value corresponding to the driving information of the unmanned vehicle under the driving scenario information according to the driving information of the unmanned vehicle, the driving scenario information of the unmanned vehicle and the boundary value list, and determine that the course of the unmanned vehicle will be out of control if a value represented by the driving information of the unmanned vehicle is beyond the predefined boundary value corresponding to the driving information of the unmanned vehicle under the driving scenario information.

12. The apparatus according to claim 7, wherein the driving information is any one of: an acceleration, a deceleration, a vehicle response time, a speed, and location information of an obstacle.

13. A controlling device, comprising: a transmitter, a receiver, a memory and a processor, wherein:

the memory is configured to store computer instructions, and the processor is configured to execute the computer instructions stored in the memory to implement the method for controlling an unmanned vehicle according to claim 1.

14. A non-transitory storage medium, comprising: a readable storage medium and computer instructions, wherein the computer instructions are stored in the readable storage medium and are configured to implement the method for controlling an unmanned vehicle according to claim 1.

* * * * *